(12) United States Patent
Sander et al.

(10) Patent No.: US 6,446,528 B1
(45) Date of Patent: Sep. 10, 2002

(54) DECOUPLED ACTUATING ELEMENT FOR A LATCHING DEVICE FOR A SELECTOR LEVER

(75) Inventors: Edmund Sander, Leonberg; Peter Hoebel, Neuhausen; Sven Hartnigk, Remseck/N., all of (DE)

(73) Assignee: Dr. Ing. h.c.f. Porsche AG, Weissach (DE)

( * ) Notice: Subject to any disclaimer, the term of this patent is extended or adjusted under 35 U.S.C. 154(b) by 0 days.

(21) Appl. No.: 09/376,344

(22) Filed: Aug. 18, 1999

(30) Foreign Application Priority Data

Sep. 26, 1998 (DE) .......................... 198 44 277

(51) Int. Cl.⁷ ................................ G05G 5/06
(52) U.S. Cl. ...................................... 74/537
(58) Field of Search ................ 74/529, 536, 537, 74/538, 473.3, 527; 200/520, 521, 522, 523

(56) References Cited

U.S. PATENT DOCUMENTS

| | | | | |
|---|---|---|---|---|
| 1,186,378 A | * | 6/1916 | Christensen et al. | 74/536 X |
| 3,731,272 A | * | 5/1973 | Cryer | 74/538 X |
| 4,881,425 A | * | 11/1989 | Kanno | 74/538 |

FOREIGN PATENT DOCUMENTS

| | | | |
|---|---|---|---|
| JP | 56-119760 | * 9/1981 | 74/538 |
| JP | 06331009 | 11/1994 | |
| JP | 08159249 | 6/1996 | |
| WO | 95/13933 | 5/1995 | |
| WO | WO95/13933 | 5/1995 | |

* cited by examiner

Primary Examiner—David A. Bucci
Assistant Examiner—Vicky A. Johnson
(74) Attorney, Agent, or Firm—Crowell & Moring LLP

(57) ABSTRACT

An actuating element for a latching device of a selector lever is provided. To prevent improper unlatching of the latching device, the force that can be introduced by an actuating element into a transfer rod is limited by a pretensioned spring located therebetween.

17 Claims, 1 Drawing Sheet

DECOUPLED ACTUATING ELEMENT FOR A LATCHING DEVICE FOR A SELECTOR LEVER

BACKGROUND AND SUMMARY OF THE INVENTION

This application claims the priority of German application 198 44 277.7, filed in Germany on Sep. 26, 1998, the disclosure of which is expressly incorporated by reference herein.

The invention relates to an actuating element for a latching device of a selector lever, with the actuating element being connected with a transfer element to transfer a movement of the actuating element to the latching device.

An actuating element of this kind is known for example from WO 95/13933 in which an actuating element designed as a button is located endwise on a transfer element designed as a rod. The movement of the button is transferred by the rod to a latching device; when the button is pressed, the latching device is unlocked. In order to keep the button in its resting position, a compression spring abutting the housing is provided below the button. The knob and the rod are permanently connected to one another so that the actuating force applied to the button is conducted fully into the latching device.

The problem then arises that latching devices for selector levers, for example in the form of a shift lock latching device, are to be protected against improper unlocking. On the other hand, the actuating force to be supported by the latching device is usually limited.

Hence, a goal of the invention is to provide an actuating element for a latching device of a selector lever in which improper actuation is prevented.

This goal is achieved by providing an actuating element for a latching device of a selector lever, with the actuating element being connected with a transfer element for transmitting a movement of the actuating element to the latching device, wherein a device for limiting the actuating force is provided in the actuating element.

According to the invention, it is proposed to provide in the actuating element a device to limit the actuating force. In an advantageous manner, the actuating force is limited by this arrangement to a value that can still be accepted by the latching device. Misuse is therefore prevented.

Other advantageous features of preferred embodiments of the invention are described below and in the claims.

It is proposed in preferred embodiments of the invention to design the device to limit the actuating force as a pretensioned spring. In this manner, the point at which a movement of the actuating element no longer leads to a movement of the transfer element can be set exactly. As soon as the pretensioning force on the spring is reached, actuation of the actuating element with increased force leads only to a movement of the actuating element against the pretensioned spring. The pretensioned spring is advantageously located in a cavity provided inside the actuating element and open on one side. The opening of the cavity is covered by a plate which in turn has a receptacle for the transfer element. The plate serves for reliable transfer of the forces from the pretensioned spring to the transfer element, while the cavity prevents the pretensioned spring from kinking under load. Latching devices are provided in the vicinity of the opening of the cavity which hold the plate in its resting position against the pretensioned spring, serving to facilitate assembly. On the one hand, the actuating element can be assembled like a conventional actuating element with the spring already pretensioned, and on the other hand the assembly of the plate relative to the pretensioned spring is facilitated, since no additional fastening means are required.

Other objects, advantages and novel features of the present invention will become apparent from the following detailed description of the invention when considered in conjunction with the accompanying drawings.

DETAILED DESCRIPTION OF THE DRAWINGS

Figure 1:
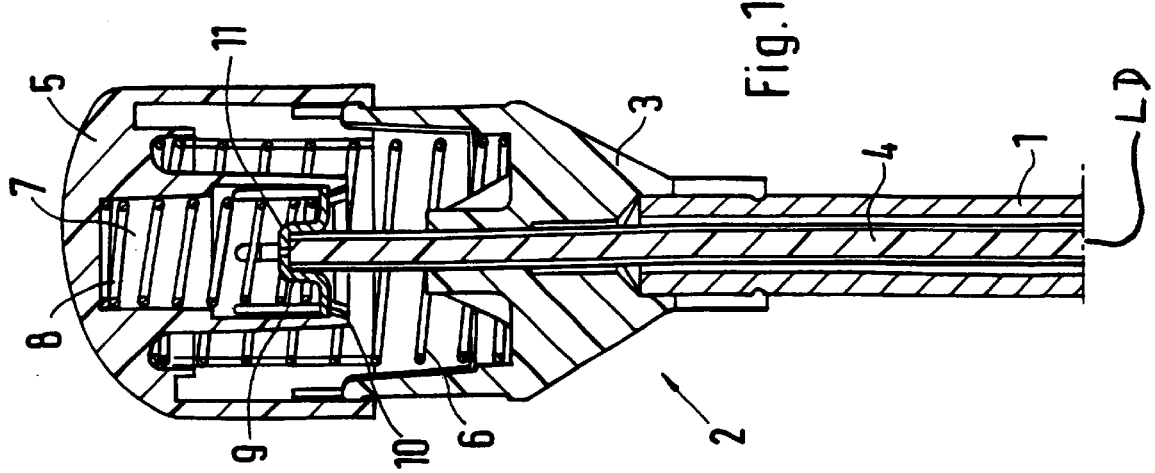
FIG. 1 is a lengthwise section through a selector lever in the non-actuated state with an actuating element according to the invention and a transfer element.

The selector lever 1 shown in FIG. 1 has a button 2 on its top. A bottom part 3 of button 2 is held on the selector lever pushing it on. Inside selector lever 1 and penetrating lower part 3, rod 4 is provided that is used as-a transfer element to a schematically depicted latching device LD, the latching device being unlocked by pressing on rod 4. An upper part 5 of button 2 latches with lower part 3 but is movable lengthwise, and forms an actuating element for the latching device LD. Between part 3 and upper part 5, a spring 6 is provided that holds upper part 5 in its resting position as shown.

Within the upper part 5, a central cylindrical cavity 7 is provided which is open on one side and receives a second spring 8. Cavity 7 is sealed by a plate 9 which the second spring 8 abuts and which likewise is guided in cavity 7. By means of a circumferential latching projection 10, plate 9 is prevented after assembly from emerging from the cylindrical opening 7 under the force of the second spring 8. The second spring 8 is pretensioned by a force of 25 N in the initial position shown. A receptacle 11 for receiving rod 4 is provided on plate 9.

Figure 2:
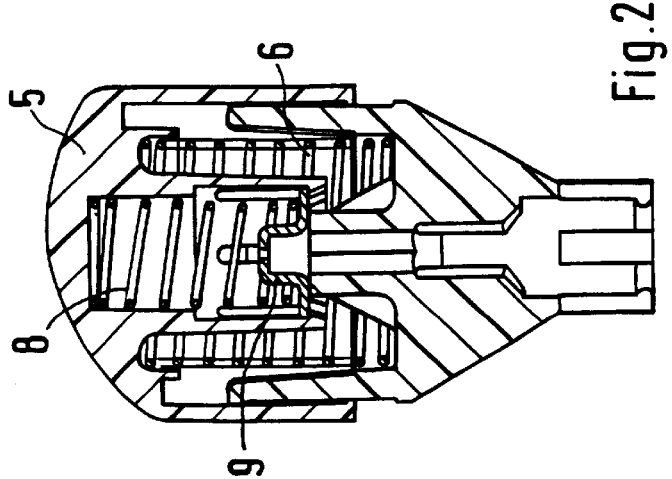
FIG. 2 shows the actuating element of FIG. 1 in the actuated state during a normal actuation.

Conventional actuating forces for the latching device lie in the range from 2.8 to 25 N. As shown in FIG. 2, as such actuating forces the upper part 5 is moved downward against the force of first spring 6. Since the pretensioning force of the second spring 8 is greater than the actuating force, the plate 9 remains in its resting position relative to upper part 5 and rod 4 is therefore moved.

Figure 3:
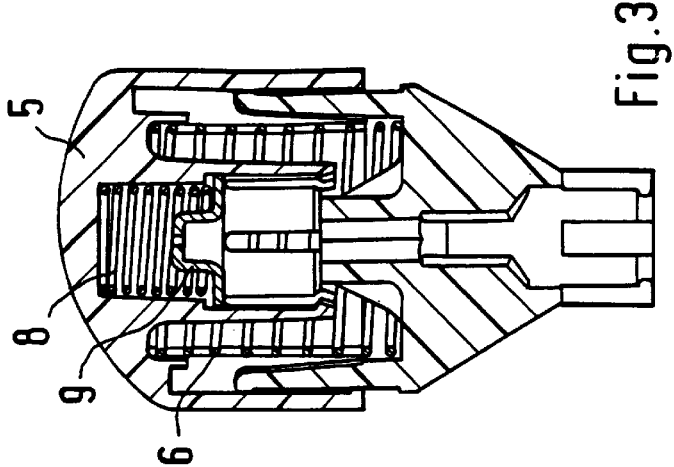
FIG. 3 shows the actuating element of FIG. 1 in the actuated state during an improper actuation.

However, as shown in FIG. 3, if the maximum admissible actuating force of 25 N is exceeded with the latching device LD latched and with rod 4 therefore blocked, upper part 5 moves against the force of first spring 6 and;also against the force of second spring 8. Despite the movement of upper part 5, plate 9 and hence rod 4 do not move. This is because the pretensioning force on the second spring 8 has been exceeded and plate 9 is moved against the force of second spring 8 into cavity 7.

In this design of the upper part 5 designed as an actuating element, the maximum actuating force exerted on the rod is limited to the pretensioning force of second spring 8, in this case 25 N.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A selector lever assembly comprising:

a latching device, a manually engageable member, a transfer element operably connected with the latching device and movable in response to movement of the manually engageable member, and an actuating force limiter interposed between the manually engageable member and the transfer element to limit the actuating force transferred between the manually engageable member and the transfer element, wherein the actuating force limiter includes:

a plate formed separately from and moveable with respect to the transfer element, said plate having a receptacle for an end of the transfer element, and a pretensioned spring interposed between the manually engageable member and the plate.

2. A selector, lever assembly according to claim 1, wherein the manually engageable member is a push button which has a cavity housing the pretensioned spring and accommodating movement of said plate with respect to said push button and with respect to said transfer element.

3. A selector lever assembly according to claim 2, wherein latching devices are provided in a vicinity of an opening of the cavity in order to hold the plate in its resting position when the spring is pretensioned.

4. A selector lever assembly according to claim 2, wherein the push button is an upper part of a push button assembly which includes a bottom button part which is held on a selector lever which surrounds the transfer element, said push button being telescopically guided on the bottom button part.

5. A selector lever assembly according to claim 4, wherein a further spring is interposed between the push button and the bottom button part for biasing the push button toward a raised inactive position.

6. A selector lever assembly which includes a transfer element operable to control a latching device and a top push button assembly for actuating the transfer element, said top push button assembly comprising:

a top push button part which in use is manually engageable by an operator, a plate disposed in the top push button part to abut an end of the transfer element, and a pretensioned spring interposed between the top push button part and the plate and operable to limit actuating forces transmitted by the top push button part to the plate and transfer element during manual movement of the top push button part, said plate being separate from and moveable with respect to the transfer element and being moveable in the top push button part against forces of the pretensioned spring.

7. An assembly according to claim 6, wherein the top push button part includes circumferential latching projections operable to hold the plate together with the top push button part.

8. An assembly according, to claim 6, wherein the plate includes a receptacle for receiving an end of the transfer element when in an in use operating position.

9. An assembly according to claim 7, wherein the plate includes a receptacle for receiving an end of the transfer element when in an in use operating position.

10. An assembly according to claim 7, wherein the pretensioned spring is pretensioned to a predetermined force in excess of a predetermined range of actuating forces to be applied to the top push button part during normal operating conditions.

11. An assembly according to claim 8, wherein the pretensioned spring is pretensioned to a predetermined force in excess of a predetermined range of actuating forces to be applied to the top push button part during normal operating conditions.

12. An assembly according to claim 10, wherein said predetermined force is 25N.

13. An assembly according to claim 11, wherein said predetermined force is 25N.

14. An assembly according to claim 6, wherein said top push button part includes a central cavity surrounding the pretensioning spring.

15. An assembly according to claim 14, wherein said plate is disposed to be guided moveably in the central cavity.

16. An assembly according to claim 15, wherein said central cavity is a cylindrical cavity.

17. An assembly according to claim 15, wherein the top push button part includes circumferential latching projections operable to hold the plate together with the top push button part.

* * * * *